(12) United States Patent
Lee

(10) Patent No.: US 7,564,495 B2
(45) Date of Patent: Jul. 21, 2009

(54) THIN IMAGE-CAPTURING DEVICE

(75) Inventor: Hung-Te Lee, Hsin-Tien (TW)

(73) Assignee: Maxemil Photonics Corporation, Hsin-Tien (TW)

( * ) Notice: Subject to any disclaimer, the term of this patent is extended or adjusted under 35 U.S.C. 154(b) by 611 days.

(21) Appl. No.: 11/153,523

(22) Filed: Jun. 14, 2005

(65) Prior Publication Data

US 2006/0279653 A1     Dec. 14, 2006

(51) Int. Cl.
*H04N 5/225*     (2006.01)

(52) U.S. Cl. ........................................ 348/335; 356/71

(58) Field of Classification Search ................ 348/335, 348/349, 366, 266; 356/71; 382/127, 124, 382/126
See application file for complete search history.

(56) References Cited

U.S. PATENT DOCUMENTS

| | | | | |
|---|---|---|---|---|
| 5,436,716 A | * | 7/1995 | Stein | ........................... 356/71 |
| 5,621,516 A | * | 4/1997 | Shinzaki et al. | ................ 356/71 |
| 6,011,860 A | * | 1/2000 | Fujieda et al. | ............... 382/126 |
| 6,657,185 B2 | | 12/2003 | Shiratsuki et al. | |
| 6,956,608 B1 | * | 10/2005 | Shapiro et al. | .............. 348/335 |
| 7,315,632 B2 | * | 1/2008 | Spycher et al. | .............. 382/124 |

* cited by examiner

*Primary Examiner*—David L Ometz
*Assistant Examiner*—Ahmed A Berhan
(74) *Attorney, Agent, or Firm*—Christensen O'Connor Johnson Kindness PLLC

(57) ABSTRACT

An image-capturing device for forming an image of an uneven surface of an object includes a light-guiding plate that has a detection surface for contacting the uneven surface of the object, a pair of lateral surfaces, one of which receives incident light from a primary light source such that the incident light is able to illuminate the uneven surface of the object on the detection surface, a total internal reflection surface opposite to the detection surface for reflecting totally light scattered by the uneven surface of the object, and a reflector surface connected to and forming a tilt angle with the total internal reflection surface. An imaging system is disposed to receive the light that was reflected by the reflector surface and that exits the light-guiding plate so as to form the image of the uneven surface of the object.

20 Claims, 6 Drawing Sheets

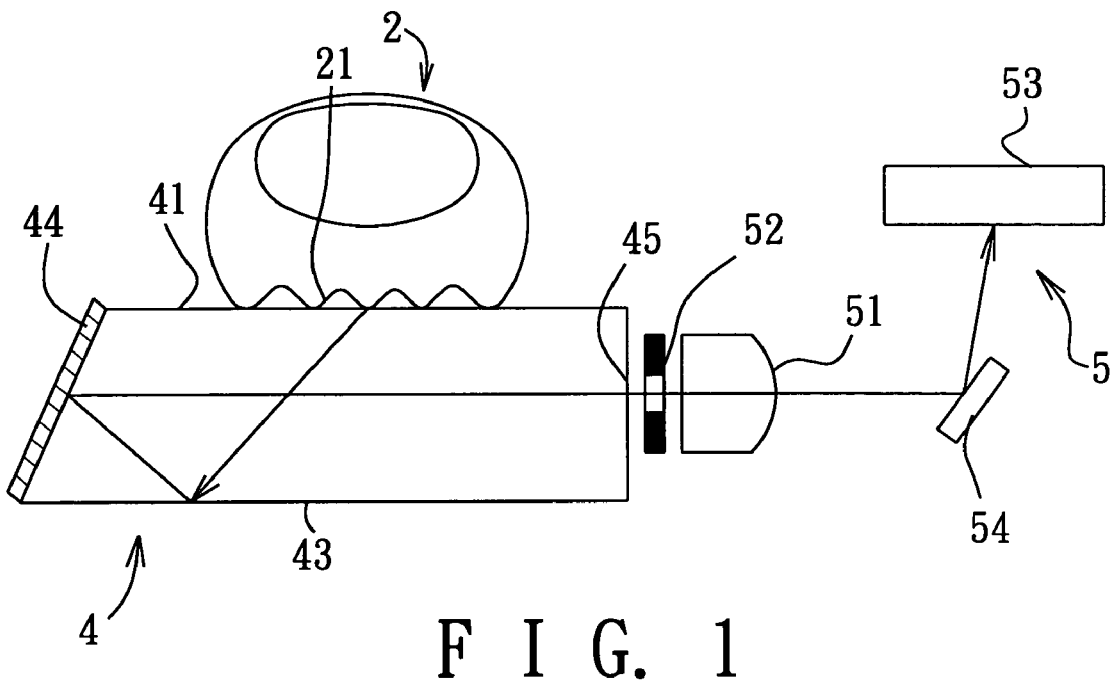
F I G. 1
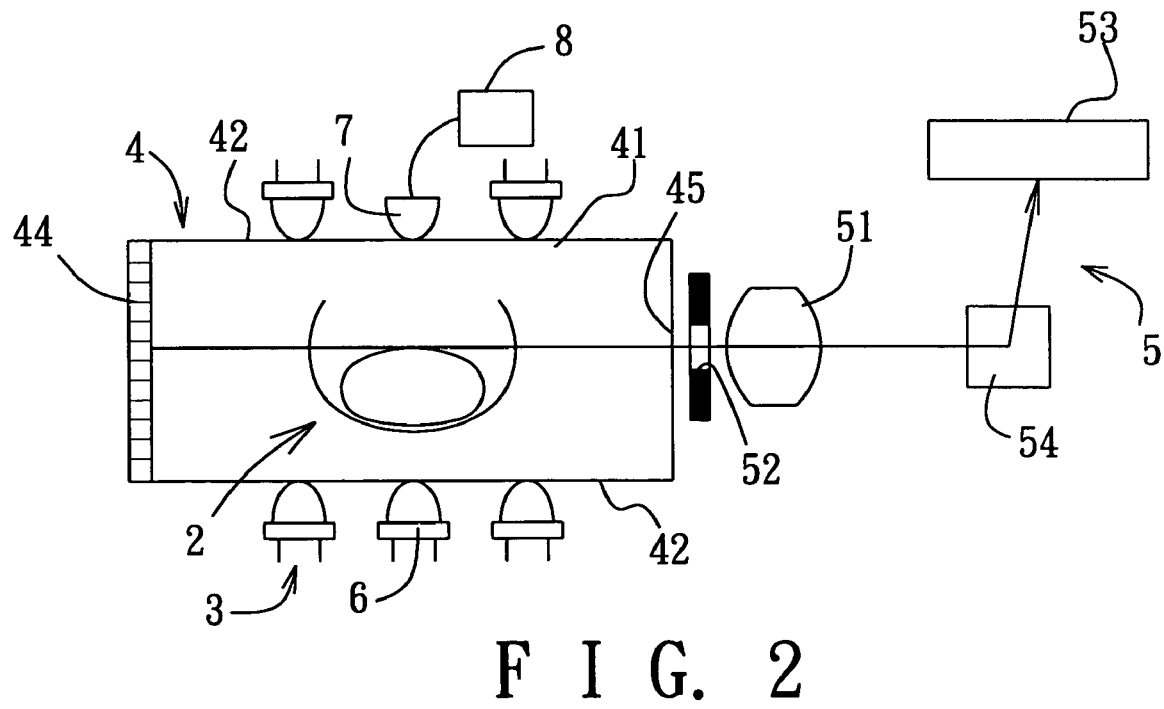
F I G. 2

THIN IMAGE-CAPTURING DEVICE

BACKGROUND OF THE INVENTION

1. Field of the Invention

The invention relates to an image-capturing device, more particularly to a thin image-capturing device for forming an image of an uneven surface of an object.

2. Description of the Related Art

In U.S. Pat. No. 5,621,516, there is disclosed an optical device for forming an image of an uneven surface. The optical device includes a plane-parallel plate with a pair of parallel plane surfaces and made of a transparent material having a refractive index larger than that of water. An object having an uneven surface, such as a finger, is placed in close contact with one of the plane surfaces of the plane-parallel plate. A light source illuminates the object through the other one surface of the plane-parallel plate. When light rays are scattered back into the plane-parallel plate by the uneven surface of the object and are totally reflected at the other one of the plane surfaces of the plane-parallel plate, only light rays totally reflected at an angle larger than a critical angle are received by an image-capturing device.

In U.S. Pat. No. 6,657,185, there is disclosed an uneven pattern detector that includes first and second optical systems, and a transparent light guide body. The first optical system has a light source. The light guide body has an incident face receiving incident light from the light source, a detection face facing the incident face for placing of a subject having an uneven pattern, a curved surface reflecting scattered light from the detection face, and an optical surface facing the curved surface and having an opening outputting light reflected from the curved surface. The second optical system, such as an imaging lens, guides the light from the opening of the optical surface to a camera device.

In the aforementioned conventional devices, the light source is disposed opposite to the surface where the target object or subject is to be placed. This results in a relatively thick size for the aforementioned conventional devices. It is thus desirable to further reduce the size of the aforementioned devices to meet current trends toward miniaturization for application in portable electronic devices.

SUMMARY OF THE INVENTION

Therefore, the object of the present invention is to provide a thin image-capturing device that is capable of forming an image of an uneven surface of an object and that can overcome the aforesaid drawbacks of the prior art.

Accordingly, an image-capturing device of the present invention is adapted for forming an image of an uneven surface of an object, and comprises a primary light source, a light-guiding plate, and an imaging system.

The light-guiding plate is made of a transparent material, and has a detection surface, a pair of lateral surfaces, a total internal reflection surface, a light-exiting surface, and a reflector surface. The detection surface is adapted for contacting the uneven surface of the object. The lateral surfaces are connected respectively to opposite edges of the detection surface. One of the lateral surfaces receives incident light from the primary light source such that the incident light is able to illuminate the uneven surface of the object on the detection surface. The total internal reflection surface is opposite to the detection surface, and is able to reflect the light that was scattered by the uneven surface of the object on the detection surface back into the light-guiding plate. The reflector surface is connected to and forms a tilt angle with the total internal reflection surface. The reflector surface is able to reflect the light that was reflected back into the light-guiding plate by the total internal reflection surface so as to cause the light to exit the light-guiding plate at the light-exiting surface.

The imaging system is disposed to receive the light that was reflected by the reflector surface and that exits the light-guiding plate so as to form the image of the uneven surface of the object. The imaging system has at least one of a cylindrical surface and a toric surface for image correction.

BRIEF DESCRIPTION OF THE DRAWINGS

Other features and advantages of the present invention will become apparent in the following detailed description of the preferred embodiments with reference to the accompanying drawings, of which:

FIG. 1 is a schematic side view of the first preferred embodiment of a thin image-capturing device according to the present invention;

FIG. 2 is a schematic top view of the first preferred embodiment;

DETAILED DESCRIPTION OF THE PREFERRED EMBODIMENTS

Figure 3:
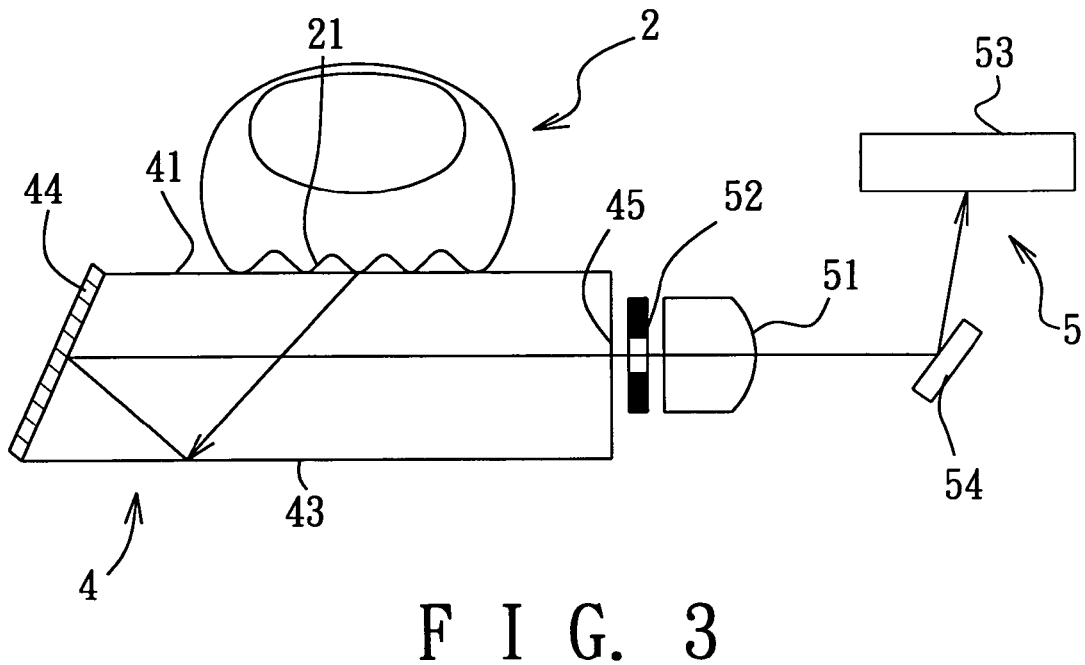
FIG. 3 is a schematic side view of the second preferred embodiment of a thin image-capturing device according to the present invention.

Before the present invention is described in greater detail with reference to the accompanying preferred embodiments, it should be noted herein that like elements are denoted by the same reference numerals throughout the disclosure.

Referring to FIGS. 1 and 2, the first preferred embodiment of a thin image-capturing device according to the present invention is shown to be adapted for forming an image of an uneven surface 21 of an object 2, which is exemplified as a finger in this embodiment. The thin image-capturing device includes a primary light source 3, a light-guiding plate 4, an imaging system 5, an auxiliary light source 6, an auxiliary light detector 7, and a control circuit 8.

The primary light source 3 is operable for illuminating the uneven surface 21 of the object 2. In this embodiment, the primary light source 3 includes light-emitting diodes but should not be limited thereto.

The light-guiding plate 4 has a detection surface 41, a pair of lateral surfaces 42, a total internal reflection surface 43, a light-exiting surface 45, and a reflector surface 44. The light-guiding plate 4 is made of a transparent material, such as plastic, acrylic, glass, etc., and has a refractive index larger than that of water. The detection surface 41 is adapted for contacting the uneven surface 21 of the object 2. The lateral surfaces 42 are connected respectively to opposite edges of the detection surface 41. In this embodiment, each of the lateral surfaces 42 receives incident light from a respective group of light-emitting diodes of the primary light source 3 such that the incident light is able to better illuminate the uneven surface 21 of the object 2 on the detection surface 41. In practice, it is possible to configure the primary light source 3 to include only one group of light-emitting diodes disposed adjacent to only one of the lateral surfaces 42 to achieve the purpose of illuminating the uneven surface 21. The illuminating light is scattered by the uneven surface 21 of the object 2 on the detection surface 41. The total internal reflection surface 43 is disposed opposite to the detection surface 41, and is able to reflect the light that was scattered by the uneven surface 21 of the object 2 on the detection surface 41 back into the light-guiding plate 4. In particular, the portion of light totally reflected by the total internal reflection surface 43 has an incident angle larger than a critical angle at the boundary between the light-guiding plate 4 and ambient material (such as air). In this embodiment, the total internal reflection surface 43 is disposed parallel to the detection surface 41. The reflector surface 44 is connected to and forms a tilt angle with the total internal reflection surface 43. The light-exiting surface 45 is disposed opposite to the reflector surface 44. The reflector surface 44 is provided with a mirror or a metallic reflective coating, such as through vapor deposition techniques, and serves to reflect the light that was reflected back into the light-guiding plate 4 by the total internal reflection surface 43 so as to cause the light to exit the light-guiding plate 4 at the light-exiting surface 45. In an example where the light-guiding plate 4 has a refractive index of 1.513 (for 660-nanometer light), while the critical angle between air and the light-guiding plate 4 is 41.34 degrees, the tilt angle between the reflector surface 44 and the total internal reflection surface 43 is preferably 77.5 degrees such that the reflector surface 44 is able to reflect the light received from the total internal reflection surface 43 toward the light-exiting surface 45 in a direction parallel to the detection and total internal reflection surfaces 41, 43. In practice, the total internal reflection surface 43 and the reflector surface 44 may be designed as spherical surfaces.

The imaging system 5 is disposed to receive the light that was reflected by the reflector surface 44 and that exits the light-guiding plate 4 at the light-exiting surface 45 so as to form the image of the uneven surface 21 of the object 2. The imaging system 5 includes a first lens 51, an aperture stop 52, an image sensor 53, and a reflector component 54. In this embodiment, the first lens 51 is an anamorphic lens, at least one surface of which is one of a cylindrical surface and a toric surface. The cylindrical or toric surface of the first lens 51 results in optimum magnification and focal length in longitudinal and lateral directions for correcting trapezoidal distortion. The other surface of the anamorphic lens may be a non-spherical surface to promote imaging quality. The aperture stop 52 is disposed between the first lens 51 and the light-exiting surface 45 of the light-guiding plate 4. The image sensor 53 is used to sense the image of the uneven surface 21 of the object 2, and may be implemented as a charge-coupled device (CCD), a complementary metal oxide semiconductor (CMOS) sensor, etc. The reflector component 54 is disposed at an optical path between the first lens 51 and the image sensor 53, and is used to shorten the overall length of the thin image-capturing device. The reflector component 54 may include a reflecting mirror, a reflecting prism, etc.

The auxiliary light source 6 is disposed adjacent to one of the lateral surfaces 42 of the light-guiding plate 4, and is located proximate to the detection surface 41. In this embodiment, the auxiliary light source 6 includes a light-emitting diode but should not be limited thereto.

The auxiliary light detector 7 is disposed adjacent to the other one of the lateral surfaces 42 of the light-guiding plate 4 opposite to the auxiliary light source 6 for receiving light emitted by the auxiliary light source 6.

The control circuit 8 is connected to the auxiliary light detector 7, and is operable so as to control the primary light source 3 in accordance with the amount of light received by the auxiliary light detector 7 from the auxiliary light source 6. In particular, when the uneven surface 21 of the object 2 is not placed on the detection surface 41, the auxiliary light detector 7 receives a maximum amount of light from the auxiliary light source 6, and the control circuit 8 controls the primary light source 3 to operate in a power saving mode. On the other hand, when the uneven surface 21 of the object 2 is placed on the detection surface 41, the auxiliary light detector 7 receives less light from the auxiliary light source 6, and the control circuit 8 controls the primary light source 3 to operate in a surface illuminating mode.

Figure 4:
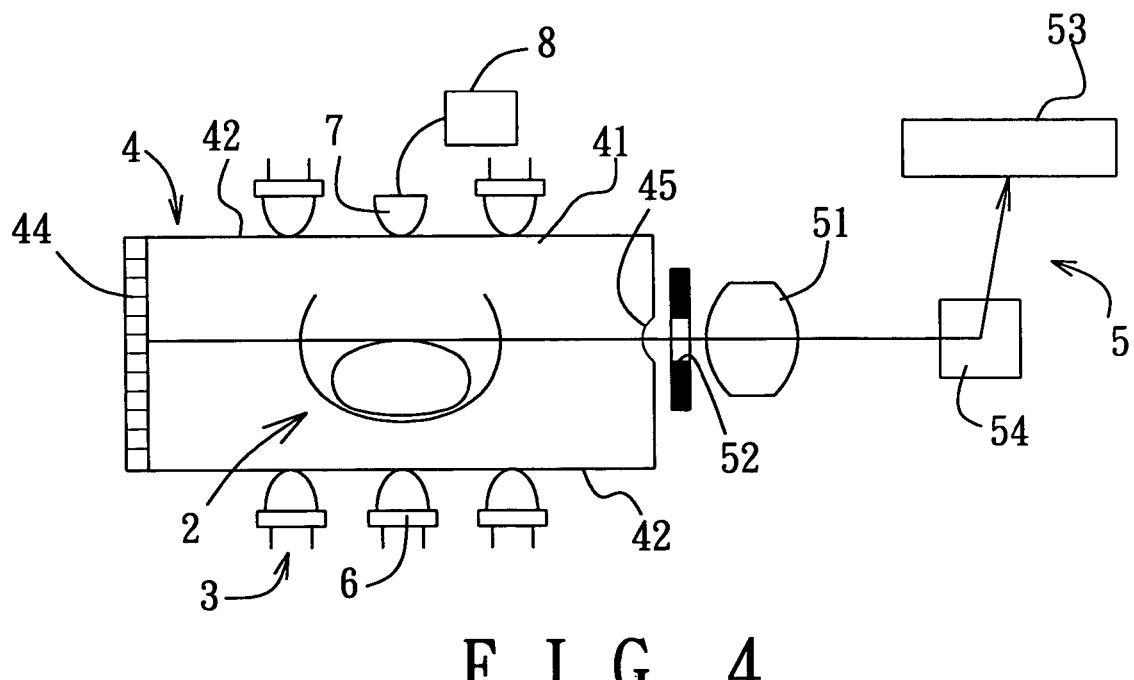
FIG. 4 is a schematic top view of the second preferred embodiment.

Referring to FIGS. 3 and 4, the second preferred embodiment of the thin image-capturing device according to this invention is shown to differ from the previous embodiment in that the light-exiting surface 45 of the light-guiding plate 4 in this embodiment is formed as a concave cylindrical surface that cooperates with the aperture stop 52 and the first lens 51 to improve imaging quality.

Figure 5:
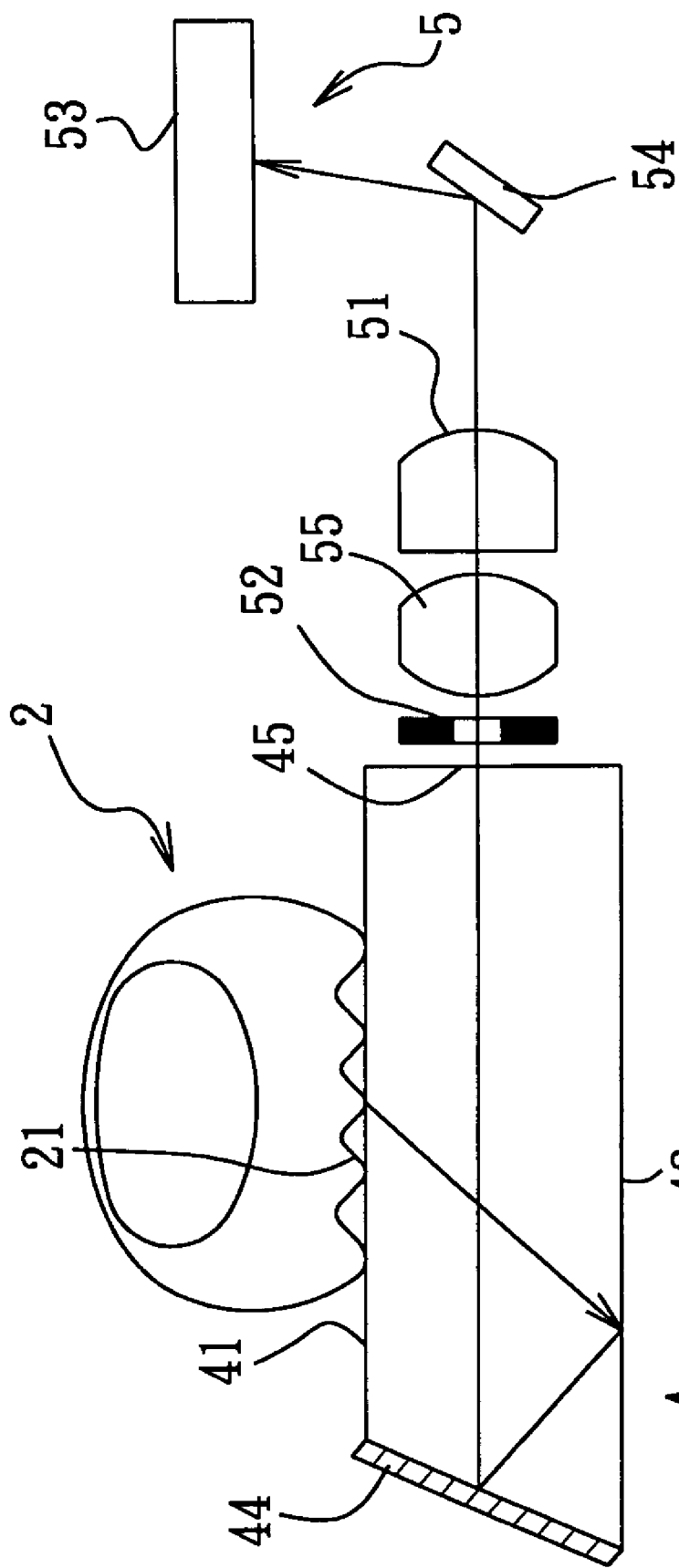
FIG. 5 is a schematic side view of the third preferred embodiment of a thin image-capturing device according to the present invention.
Figure 6:
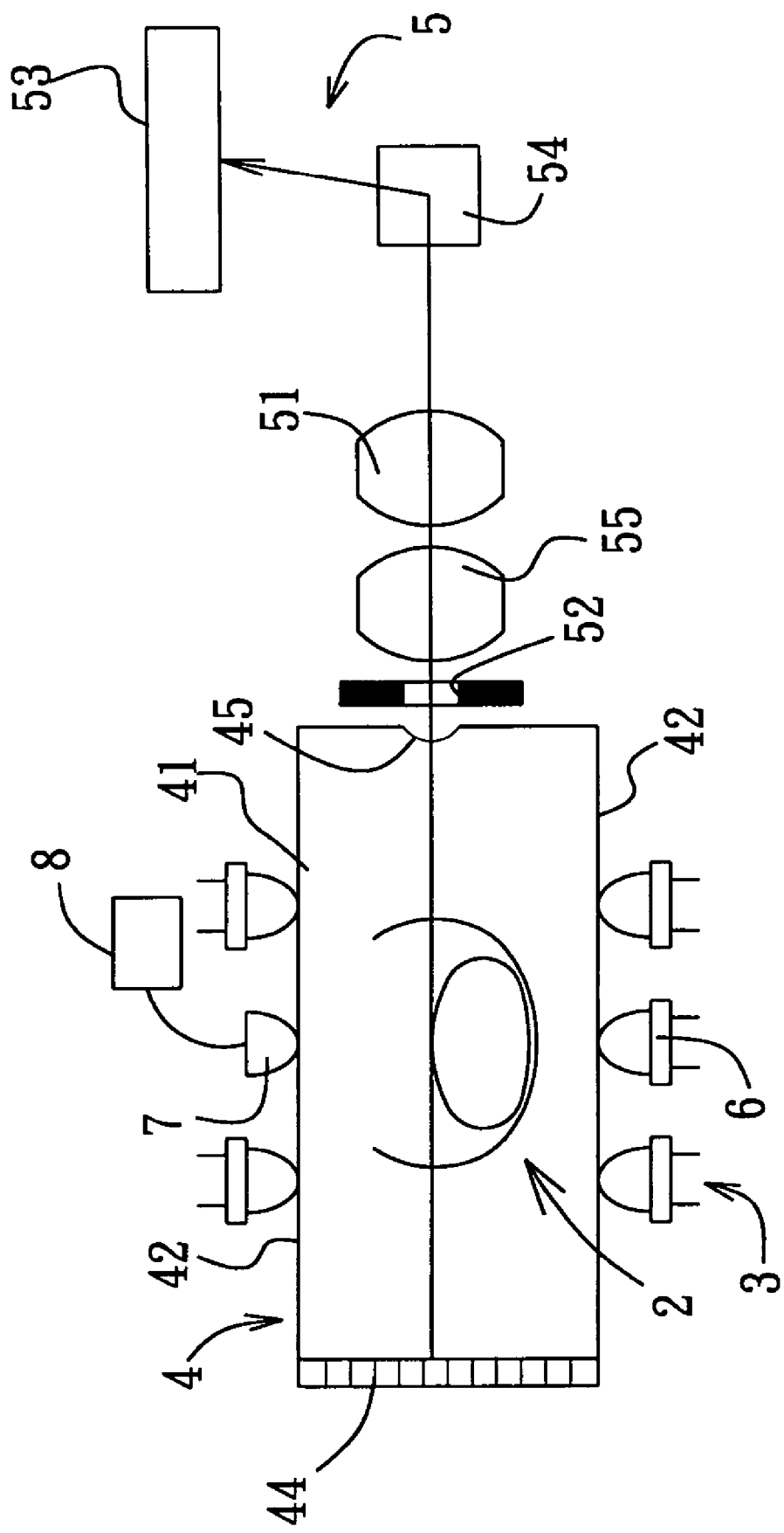
FIG. 6 is a schematic top view of the third preferred embodiment.

Referring to FIGS. 5 and 6, the third preferred embodiment of the thin image-capturing device according to this invention is shown to differ from the second embodiment in that the imaging system 5 of this embodiment further includes a second lens 55 disposed between the first lens 51 and the aperture stop 52. The second lens 55 is a positive lens, and has at least one non-spherical surface for correcting aberration of the imaging system 5.

Figure 7:
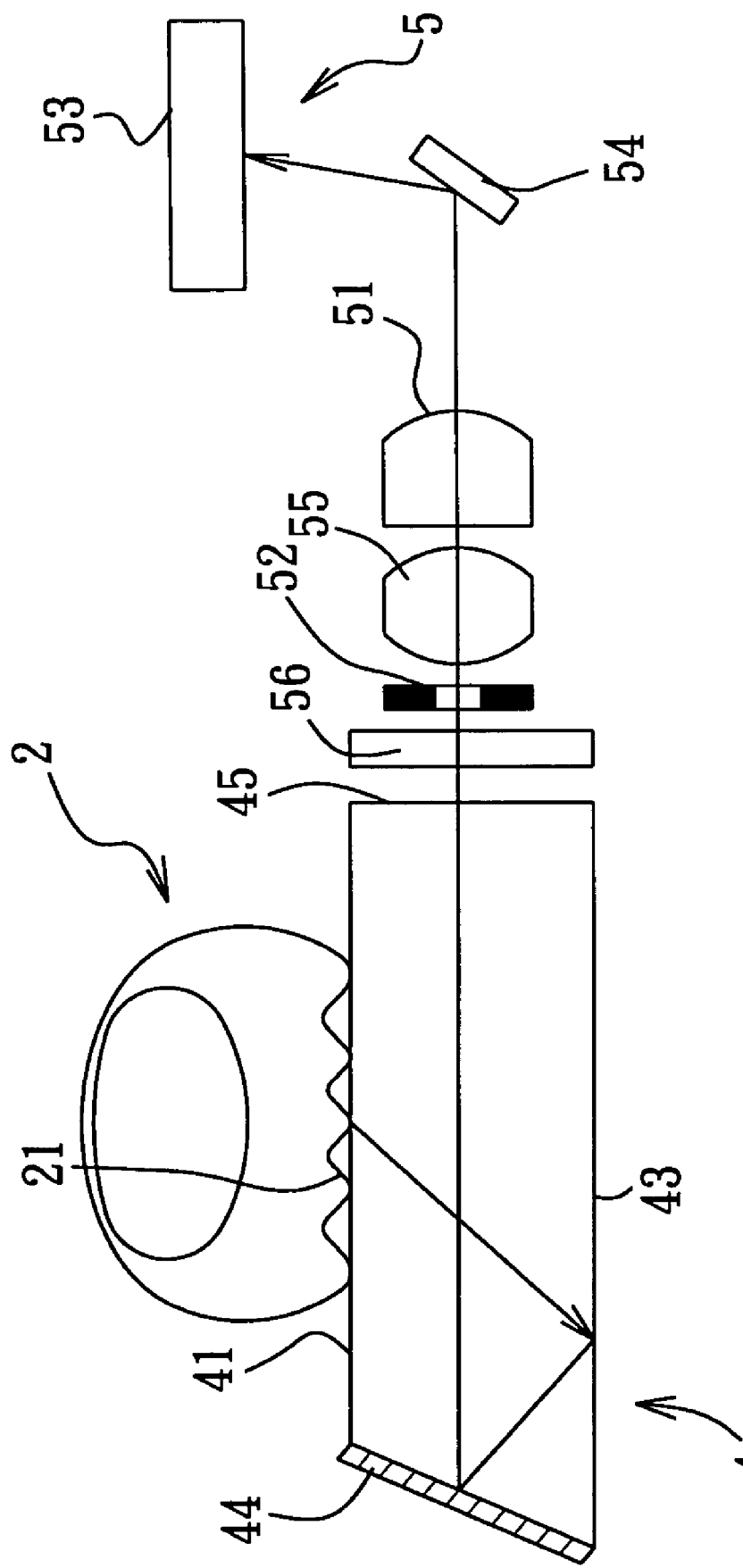
FIG. 7 is a schematic side view of the fourth preferred embodiment of a thin image-capturing device according to the present invention.
Figure 8:
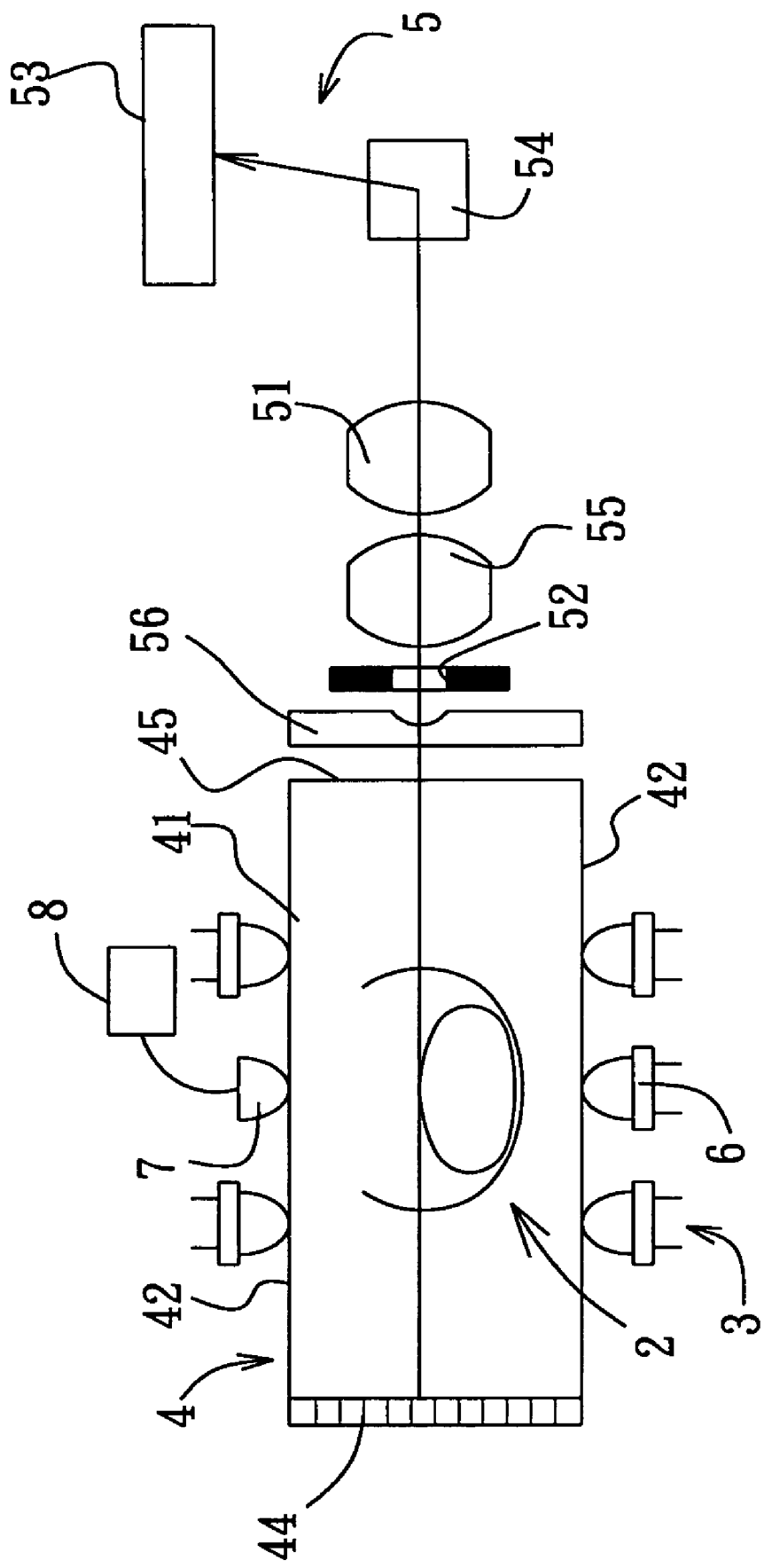
FIG. 8 is a schematic top view of the fourth preferred embodiment.

Referring to FIGS. 7 and 8, the fourth preferred embodiment of the thin image-capturing device according to this invention is shown to differ from the third embodiment in that the imaging system 5 of this embodiment includes a concave cylindrical lens 56 that is disposed between the light-exiting surface 45 of the light-guiding plate 4 and the aperture stop 52. Moreover, unlike the second and third embodiments, the light-exiting surface 45 of the light-guiding plate 4 in this embodiment is not formed as a concave cylindrical surface.

By disposing the primary light source 3 at one of the lateral surfaces 42 of the light-guiding plate 4, the thickness of the light-guiding plate 4 can be reduced. In addition, imaging quality is promoted due to the image correcting functions attributed to the lens surfaces of the imaging system 5. Furthermore, it is possible to operate the primary light source 3 in a power saving mode to prolong the service life of the same.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A thin image-capturing device for forming an image of an uneven surface of an object, said thin image forming device comprising:
    a primary light source;
    a light-guiding plate made of a transparent material and having
        a detection surface adapted for contacting the uneven surface of the object,
        a pair of lateral surfaces directly connected respectively to opposite edges of said detection surface, wherein said primary light source is disposed adjacent to one of said lateral surfaces and said lateral surface receives incident light from said primary light source, such that the incident light is able to illuminate the uneven surface of the object on said detection surface, a total internal reflection surface opposite to said detection surface, wherein said total internal reflection surface is able to reflect light that was scattered by the uneven surface of the object on said detection surface back into said light-guiding plate, a light-exiting surface, and a reflector surface connected to and forming a tilt angle with said total internal reflection surface, wherein said reflector surface is able to reflect the light that was reflected back into said light-guiding plate by said total internal reflection surface so as to cause the light to exit said light-guiding plate at said light-exiting surface; and an imaging system disposed to receive the light that was reflected by said reflector surface and that exits said light-guiding plate so as to form the image of the uneven surface of the object, said imaging system having one of a cylindrical surface and a toric surface.

2. The thin image-capturing device according to claim 1, wherein said primary light source includes a light-emitting diode.

3. The thin image-capturing device according to claim 1, wherein said reflector surface is provided with a mirror.

4. The thin image-capturing device according to claim 1, wherein said reflector surface is provided with a reflective coating.

5. The thin image-capturing device according to claim 1, wherein said imaging system includes a first lens having said one of the cylindrical surface and the toric surface.

6. The thin image-capturing device according to claim 5, wherein said imaging system further includes an aperture stop disposed between said first lens and said light-exiting surface of said light-guiding plate.

7. The thin image-capturing device according to claim 6, wherein said light-exiting surface is opposite to said reflector surface and is formed as a concave cylindrical surface.

8. The thin image-capturing device according to claim 6, wherein said imaging system further includes a second lens disposed between said first lens and said aperture stop.

9. The thin image-capturing device according to claim 8, wherein said second lens has at least one non-spherical surface.

10. The thin image-capturing device according to claim 8, wherein said imaging system further includes a concave cylindrical lens disposed between said light-exiting surface of said light-guiding plate and said aperture stop.

11. The thin image-capturing device according to claim 1, further comprising an auxiliary light source disposed adjacent to one of said lateral surfaces of said light-guiding plate.

12. The thin image-capturing device according to claim 11, further comprising an auxiliary light detector disposed adjacent to the other one of said lateral surfaces of said light-guiding plate opposite to said auxiliary light source for receiving light emitted by said auxiliary light source.

13. The thin image-capturing device according to claim 1, wherein said imaging system includes an image sensor.

14. The thin image-capturing device according to claim 13, wherein said imaging system further includes a reflector component disposed at an optical path between said light-guiding plate and said image sensor.

15. The thin image-capturing device according to claim 14, wherein said reflector component includes a reflecting mirror.

16. The thin image-capturing device according to claim 14, wherein said reflector component includes a reflecting prism.

17. The thin image-capturing device according to claim 1, wherein said detection surface is disposed parallel to said total internal reflection surface.

18. The thin image-capturing device according to claim 17, wherein said reflector surface is disposed to reflect the light received from said total internal reflection surface in a direction parallel to said detection and total internal reflection surfaces.

19. The thin image-capturing device according to claim 1, wherein said light-guiding plate has a refractive index larger than that of water.

20. The thin image-capturing device according to claim 1, wherein said primary light source is disposed adjacent to both lateral surfaces.

* * * * *